United States Patent
Francis et al.

(10) Patent No.: US 9,532,501 B2
(45) Date of Patent: Jan. 3, 2017

(54) PLANT CONVEYOR AND METHOD FOR HARVESTING PLANTS

(71) Applicant: WEYERHAEUSER NR COMPANY, Federal Way, WA (US)

(72) Inventors: Bruce Francis, Aiken, SC (US); William Wells, Aiken, SC (US); Jimmy Lee Stokes, Aiken, SC (US)

(73) Assignee: Weyerhaeuser NR Company, Seattle, WA (US)

( * ) Notice: Subject to any disclaimer, the term of this patent is extended or adjusted under 35 U.S.C. 154(b) by 221 days.

(21) Appl. No.: 14/046,752

(22) Filed: Oct. 4, 2013

(65) Prior Publication Data

US 2015/0096771 A1 Apr. 9, 2015

(51) Int. Cl.
*A01D 25/04* (2006.01)
*A01D 33/00* (2006.01)
*A01D 25/00* (2006.01)

(52) U.S. Cl.
CPC ............. *A01D 33/00* (2013.01); *A01D 25/005* (2013.01); *A01D 25/048* (2013.01)

(58) Field of Classification Search
CPC ..... A01D 25/048; A01D 25/044; B65B 15/14; B65B 15/16; B65B 2812/018
See application file for complete search history.

(56) References Cited

U.S. PATENT DOCUMENTS

| | | | | | |
|---|---|---|---|---|---|
| 1,284,449 | A | * | 11/1918 | Prior | A01D 25/048 171/110 |
| 1,426,767 | A | * | 8/1922 | Pettengill | A01D 25/048 171/25 |
| 2,291,784 | A | * | 8/1942 | Balazs et al. | 171/12 |
| 2,368,895 | A | * | 2/1945 | Spiegl | 171/61 |
| 2,476,336 | A | * | 7/1949 | Urschel | A01D 23/04 171/61 |
| 2,590,758 | A | * | 3/1952 | Dahlman | A01D 33/06 171/49 |
| 3,366,184 | A | * | 1/1968 | Hawkins | A01D 21/04 171/61 |
| 3,497,013 | A | * | 2/1970 | Baker | A01D 45/26 171/38 |
| 3,693,721 | A | * | 9/1972 | Arnold et al. | 171/61 |
| 3,743,024 | A | * | 7/1973 | Mayo et al. | 171/25 |
| 3,827,503 | A | * | 8/1974 | Hansen | A01D 45/26 171/28 |
| 3,844,398 | A | * | 10/1974 | Pinat | B23Q 7/18 144/242.1 |
| 4,113,022 | A | * | 9/1978 | Balinte et al. | 171/61 |
| 4,263,972 | A | * | 4/1981 | Johnson | 171/61 |

(Continued)

*Primary Examiner* — Matthew D Troutman
(74) *Attorney, Agent, or Firm* — Perkins Coie LLP

(57) ABSTRACT

A conveyor includes a frame, at least two arms at least one of which is movably mounted to the frame, at least two rails wherein each rail is coupled to an end of one of said at least two arms, at least two belts wherein each belt is rotatably mounted on one of said at least two rails such that the belts are capable of engaging plants therebetween and moving the plants along a conveyor axis, and one or more bias members which are configured to bias said at least one movable arm toward the other one of said at least two arms. The conveyor further comprises an expanding mechanism which is configured to exert an outward force on said at least one movable arm upon engagement so that said at least one movable arm move away from another arm.

12 Claims, 9 Drawing Sheets

(56) References Cited

U.S. PATENT DOCUMENTS

| | | | | |
|---|---|---|---|---|
| 4,326,590 | A | * | 4/1982 | Yancey .......................... 171/61 |
| 4,629,005 | A | * | 12/1986 | Hood et al. ..................... 171/20 |
| 5,042,240 | A | * | 8/1991 | Rocca .................... A01D 46/00 |
| | | | | 198/516 |
| 5,460,477 | A | * | 10/1995 | Macchiarulo .......... B65G 15/14 |
| | | | | 156/137 |
| 5,950,804 | A | * | 9/1999 | Farkas ................... B65G 15/14 |
| | | | | 198/626.1 |

\* cited by examiner

PLANT CONVEYOR AND METHOD FOR HARVESTING PLANTS

TECHNICAL FIELD

The present application is related to a plant conveyor for grasping plants in a substantially upright orientation and moving them from a position to another position along a conveyor axis. The present application is also related to a method for harvesting plants grown in nursery beds when the plants are to be later transplanted.

BACKGROUND

Many plants are first grown in nursery beds rather than planted directly. These are then removed from the beds and transplanted into field or forest land where the plants mature. One concern is that the plants' roots and stems are relatively undamaged when they are lifted from the nursery beds. Otherwise, root loss or stem damage can have an adverse effect on plant development.

A number of harvesting apparatuses are available for harvesting or lifting plants that are subsequently to be transplanted. Some harvesting apparatuses can include plant conveyors. Some current conveyors include paired belts on a rail and pulley system mounted rigidly to a harvester frame. These paired belts grasp and move plants up and away from nursery beds. Then, the paired belts release the plants into a storage bin wherein they are gathered or stacked.

The gap between each pair of belts can be kept at a distance wide enough for the plants to travel up the belts without stem damage but close enough so that the plants do not slip from the paired belt and drop to the ground. In existing systems, the gap between each pair of belts of current conveyors can only be adjusted mechanically by loosening bolts attaching the belt rails to the harvester frame and physically moving the rails closer together or farther apart.

SUMMARY

The present disclosure is directed to providing an improved conveyor and an improved method for harvesting plants.

A conveyor according to embodiments of the present application includes a frame, at least two arms at least one of which is movably mounted to the frame, at least two rails wherein each rail is coupled to an end of one of said at least two arms, at least two belts wherein each belt is rotatably mounted on one of said at least two rails such that the belts are capable of engaging plants therebetween and moving the plants along a conveyor axis, and one or more bias members which are configured to bias said at least one movable arm toward the other one of said at least two arms. The conveyor of the present application further comprises an expanding mechanism which is configured to exert an outward force on said at least one movable arm upon engagement so that said at least one movable arm move away from another arm.

A conveyor kit according to embodiments of the present application comprises a frame, at least two arms at least one of which is movably mountable to the frame, at least two rails wherein each rail is coupleable to an end of one of said at least two arms, at least two belts wherein each belt is rotatably mountable on one of said at least two rails such that the belts are capable of engaging plants therebetween and moving the plants along a conveyor axis, and one or more bias members which is capable of biasing one of said at least two arms toward the other one of said at least two arms. A conveyor kit of the present application further includes an expanding mechanism capable of exerting an outward force on said at least one movable arm upon engagement so that said at least one movable arm move away from another arm.

A method for harvesting plants according to the present application comprises the steps of moving a body of soil containing plants onto a plant transport apparatus, engaging the one or more plants by paired belts to transfer the one or more plants between the paired belts, automatically adjusting a gap between the paired belts based in part on the diameter of the one or more plants by one or more bias members biasing at least one of the paired belts toward the other of the paired belts. A method for harvesting plants according to the present application further comprises the step of manipulating an expanding mechanism to expand the paired belts open, the expanding mechanism exerting an outward force to move one of the paired belts away from the other of the paired belts.

A conveyor according to the present application has significant advantages. First, stem damage and plant jams can be greatly mitigated due to the arrangement of bias members and movable arms which enables the gap between each pair of belts to widen or narrow without user intervention to accommodate varied diameters of plants and allows the plants to freely flow through the conveyor. Second, when plant jams occasionally occur due to operators' errors causing plants to bunch together at the entry point into paired belts or running a harvester too deep and bringing soil into the belts, they can be easily and conveniently released by manipulating an expanding mechanism capable of exerting an outward force on each movable arm to move it away from a fixed frame and expand paired belts open.

BRIEF DESCRIPTION OF THE DRAWINGS

The foregoing summary as well as the following detailed description are better understood when read in conjunction with the appended drawings. For the purpose of illustrating the invention, there are shown in the drawings exemplary constructions of the invention; however, the invention is not limited to the specific constructions disclosed. In the drawings.

DETAILED DESCRIPTION OF ILLUSTRATIVE EMBODIMENTS

Figure 1:
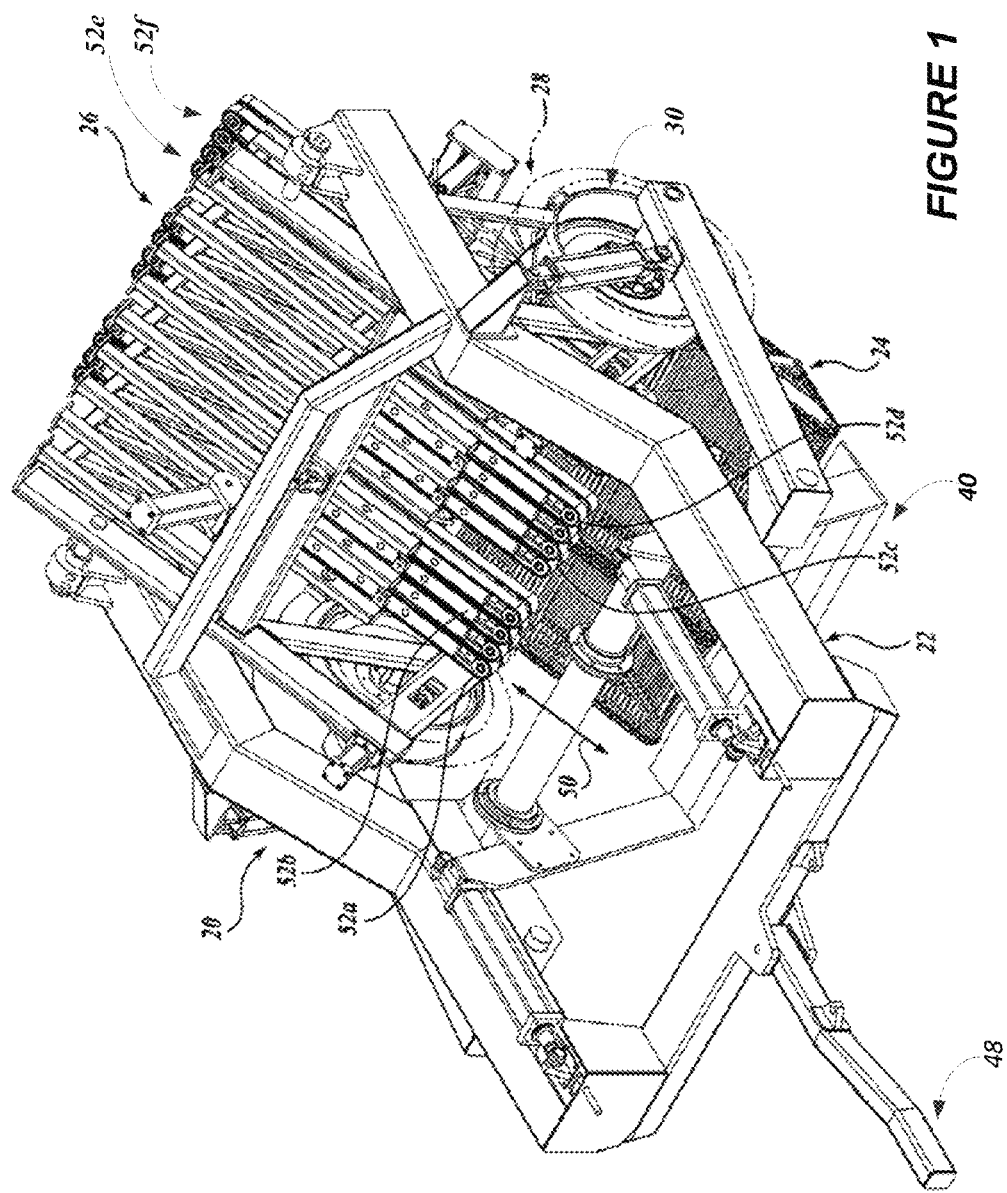
FIG. 1 is a perspective view showing a harvester.
Figure 2:
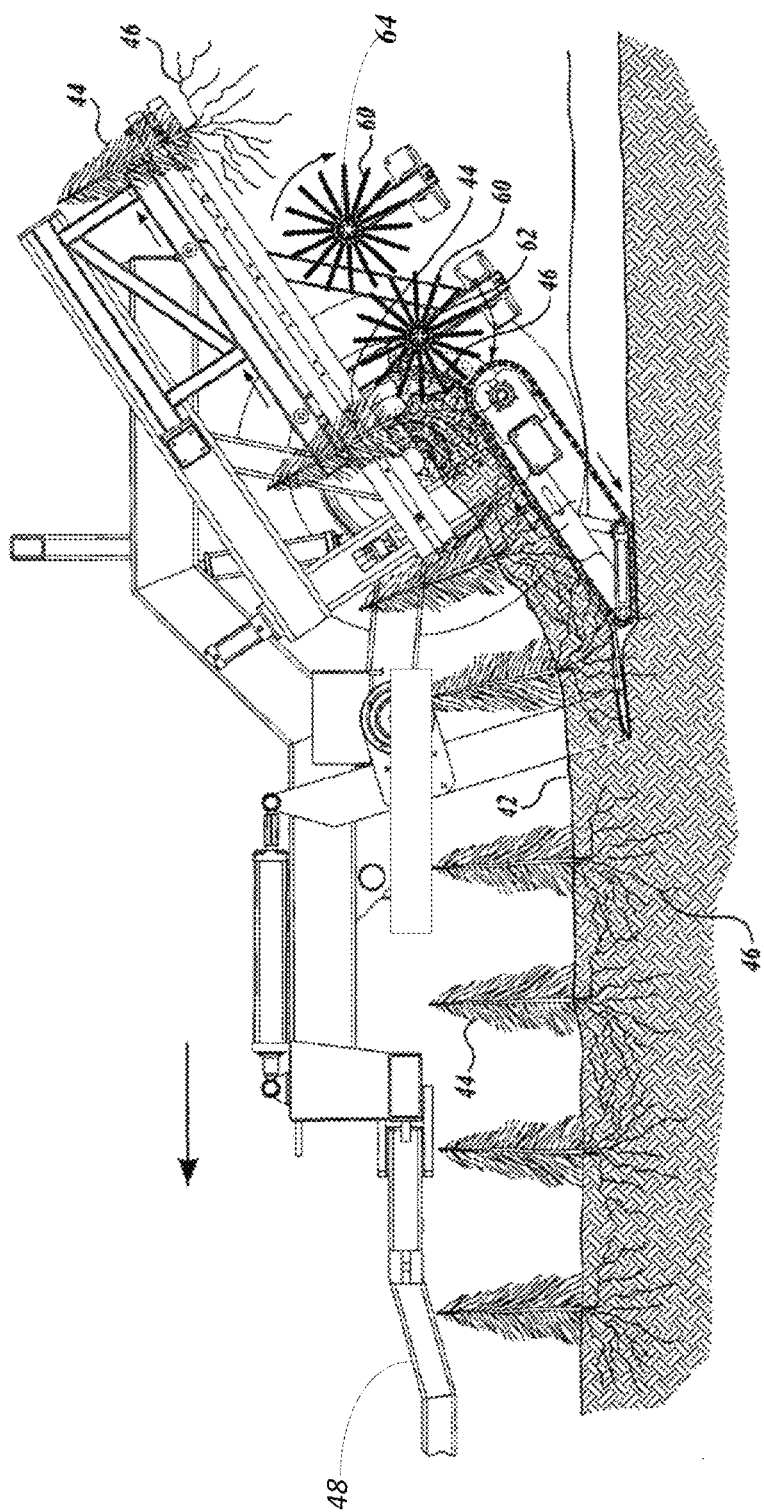
FIG. 2 is a side view of a harvester of FIG. 1 in use.

As shown in FIG. 1 and FIG. 2, a plant harvester 20 comprises a main frame 22, a plant transport apparatus 24, a conveyor 26, and root soil removers 28. The main frame 22 includes wheels 30 mounted on a moveable wheel frame. The wheel frame is mounted for selective reciprocation between a stowed position and an extended position. In the extended position, the wheels 30 are displaced into a downward position so that the harvester 20 can be towed behind a wheeled tractor or other engine driven vehicle by a hitch 48. In the stowed position, the wheels 30 are displaced into an upward position for plant lifting. The main frame 22 also includes a horizontal undercutting blade 40 which serves to sever an intact body of soil 42 containing plants 44 and their root structure 46. The position of the wheels 30 may be varied to adjust the blade depth required for lifting plants from the nursery bed. The width of the blade 40 is suitably sized to support the soil 42 of the seedling bed to minimize damage to the root structure 46 as the plants 44 are lifted from the nursery field and transferred to the plant transport apparatus 24.

The plant transport apparatus 24 is suitably a smooth surface conveyor having a plurality of horizontal openings. One such plant transport apparatus 24 is suitably manufactured from a rod chain or slated belt driven by a hydraulic motor acting through a drive chain on a sprocket. The spacing between the rods or slats allows soil to pass through while supporting the seedling bed 42. The use of the transport apparatus 24 is critical to reduce damage to the plants 44. As configured, the seedling bed 42 is continuously supported from the point it is removed from the nursery bed until entry into the root soil remover 28. This is done to minimize root tip breakage and stem damage resulting from the downward pull on the plants 44 caused by the soil weight within the root system 46. Also, the support by the transport apparatus 24 allows a wider gap between the paired belts of the conveyor 26 to reduce stem damage because there is little risk of plant slipping from the paired belts. The plant transport apparatus 24 is suitably synchronized in a manner well-known in the art to the forward speed of the harvester 20 to minimize drag against the root portion 46 of the plants 44. During operation, it is preferable that the leading end of the plant transport apparatus 24 is disposed beneath the trailing edge of the blade 40 to facilitate smooth lifting and transfer of the cut seedling bed 42 from the blade 40 to the plant transport apparatus 24.

In an embodiment, the conveyor 26 is suitably located adjacent the plant transport apparatus 24, and is positioned to transfer the plants 44 along a conveyor axis 50 that extends between the plant transport apparatus 24 and a stowage bin (not shown). The conveyor 26 is mounted on the main frame 22. The conveyor 26 comprises six pairs of belts 52a, 52b, 52c, 52d, 52e, and 52f. In order to meet a particular need of harvesting plants being sown in paired rows, every two pairs of belts are grouped together. Each pair of belts grasps the plants 44 in an upright orientation and moves them from a position before the seedling bed 42 exits the plant transport apparatus 24 to a point where the plants 44 enter the stowage bin. It is preferred to match the timing of movement of both the plant transport apparatus 24 and the conveyor 26 to minimize drag damage to the plants 44 being processed by the harvester 20. Detailed structures of an improved conveyor according to the present application will be descried below.

Each root soil remover 28 includes a plurality of flexible probes 60. The root soil removers 28 are mounted for free rotation on axles 64. The motion of the root soil removers 28 is initiated by at least a portion of the plants 44 passing through the plurality of flexible probes 60. For instance, as the plants 44 is transported in the harvester 20 by the conveyor 26, the root portion 46 contacts the plurality of flexible probes 60 to cause the rotation of the root soil removers 28 on the axles 64. Note that the root soil removers 28 are not driven in the direction of plant travel by any mechanical means, such as a drive motor. As such, the free rotating nature of the root soil removers 28 minimizes drag on the plants 44 and root tips 46 during use. This is advantageous as reduced drag reduces damage to the roots 46.

Operation of the harvester 20 may be best understood by referring to FIG. 2. The harvester 20 is towed behind a wheeled tractor or other engine driven vehicle (not shown) by the hitch 48. The plants 44 are shown growing in the ground in front of the harvester 20. The plants 44 are picked up including a body of soil 42 which has been severed by the blade 40. The soil body 42 containing the plants 44 is lifted onto the plant transport apparatus 24 by the forward motion of the harvester 20. The soil 42 and the plants 44 are conveyed along the plant transport apparatus 24 to a point where the stem portions of the plants 44 are engaged by the paired belts of the plant conveyor 26. As the plants 44 are propelled within the paired belts of the plant conveyor 26, they exit the end of the plant transport apparatus 24 where they gently engage the root soil remover 28. The motion of the plants 44 relative to the root soil remover 28 causes the rotation of the root soil remover 28. The plurality of flexible probes 60 of the root soil remover 28 flex in the direction of plant flow (shown by the conveyor axis 50) to remove the soil 42. At the end of the paired belts of the conveyor 26, the plants 44 are discharged from the belts into the storage bin for sorting, counting, and subsequent packaging.

The use of the plant transport apparatus 24 is capable of supporting the entire seedling bed from below and the root soil remover 28 help to reduce damage to the plants. However, the plants may still jam and sustain stem damage in the paired belts of the conveyor 26 due to variances in plant diameter. In addition, the gap between a pair of belts of the conveyor 26 can only be adjusted manually. The conveyor 26 also does not have a convenient and efficient way to release plant jams in the paired belts.

Figure 3:
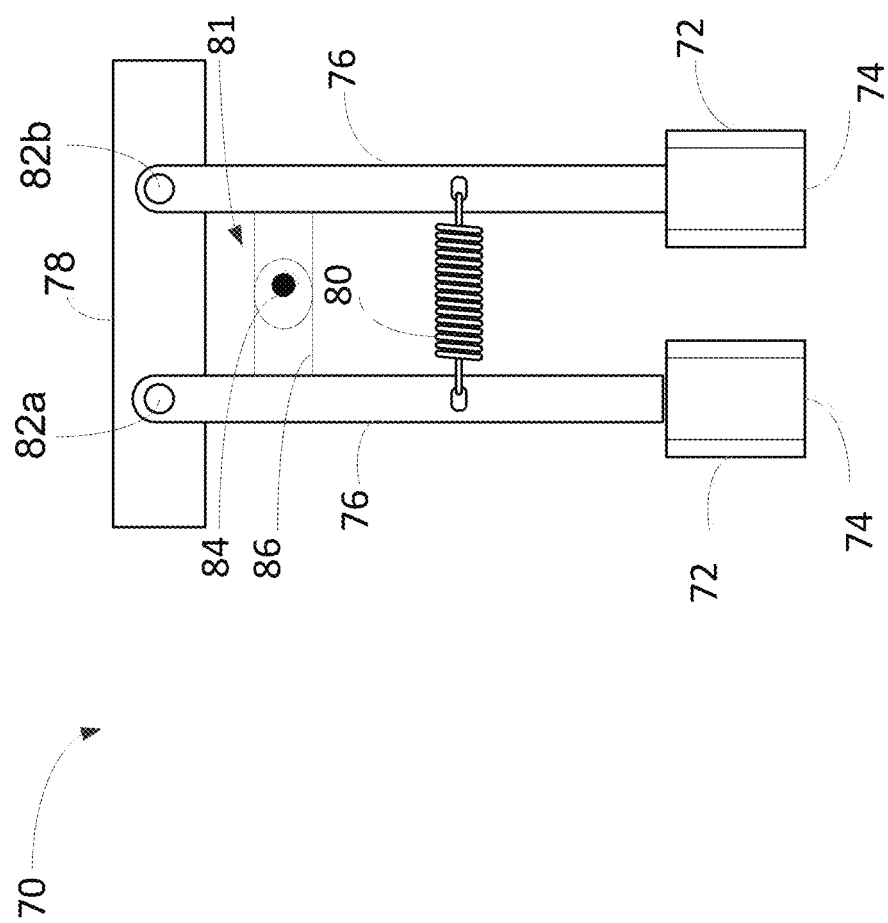
FIG. 3 is a schematic diagram showing an embodiment of a conveyor assembly comprising a pair of belts.

FIG. 3 depicts an embodiment of a conveyor assembly 70. The conveyor assembly 70 includes a pair of belts 72, a pair of rails 74, a pair of arms 76, a frame 78, one or more bias members 80, and an expanding mechanism 81. The paired belts 72 can be made of any suitable materials, such as rubber, chain links, and the like. The paired belts 72 are rotatably mounted on the pair of rails 74. The lower end of each arm 76 is fixed to the corresponding rail 74. The upper ends of the arms 76 are movably mounted to the frame 78. By way of example without limitation, the pair of arms 76 can pivot on points 82a and 82b, respectively. Optionally, one arm can be pivotably mounted to the frame 78, and another arm may be fixed to the frame 78. The one or more bias members 80 can be connected to the pair of arms 76. The one or more bias members 80 can be positioned above the pair of belts 72 and a certain distance away from the pair of belts 72 so as to allow plants to smoothly flow through the convey assembly 70. By way of example without limitation, the bias member 80 may be a linear spring connected to the pair of arms 76 (such as the spring shown in FIG. 3), a torsion spring mounted at least one of the pivot points 82a and 82b, a rubber belt connected to the arms 76, or any other types of bias member. The arrangement of the bias member 80 and movable arms 76 allows the gap between the pair of belts 72 to widen or narrow without manual adjustment by a user (i.e., automatically) to accommodate varied sizes of plants. This automatic adjustment of gap width can reduce stem damage and plant jams in the paired belts 72. Positioning the pivot points 82a and 82b at the upper ends of the arms 76 also facilitates plants to freely flow through the conveyor assembly 70 without jamming.

The expanding mechanism 81 can be connected to the pair of arms 76. The expanding mechanism 81 is configured to exert an outward force on the pair of arms 76 so that one arm moves away from the other. By way of example without limitation, the expanding mechanism 81 may include a rotabable cam 84 and a rod 86 which is engaged by the ratable cam. When the cam is rotated, an outward force can be exerted on the arms 76 by the rod 86. In this way, the pair of arms 76 can move away from each other, whereby expanding the paired belts 72 open. The arrangement of the expanding mechanism 81 allows any plant jams in the paired belts 72 to be released easily and without having to remove the one or more bias members 80.

A conveyor may comprise one or more conveyor assemblies 70. The number of conveyor assemblies included in a conveyor and the spacing between adjacent conveyor assemblies may be varied according to particular needs of harvesting operation. By way of example without limitation, for the purpose of harvesting seedlings which can be planted in beds containing six rows spaced eight inches apart, a conveyor may be configured to include six conveyor assemblies spaced approximately eight inches apart. A conveyor may also include any other number of conveyor assemblies according to particular needs. When a conveyor includes a plurality of conveyor assemblies, they can share a common frame. At least one arm of each conveyor assembly can be movably mounted to the common frame. One or more bias members can be mounted to each pair of arms. The one or more bias members may be mounted above each corresponding pair of belts and positioned a certain distance away from the corresponding pair of belts so as to allow plants to flow through the conveyor.

As mentioned above, plants can be sown in a nursery bed in paired rows for efficiency. In order to satisfy the particular need, two pairs of belts can be grouped together. FIGS. 4-7 show another embodiment of a conveyor assembly of the present application. A conveyor assembly 90 include two pairs of belts 96 and 98, two pairs of rails 100 and 102, a fixed frame 110, two movable arms 130, two supporting members 150, a plurality of bias members 160, and an expanding mechanism 170. The expanding mechanism 170 is capable of expanding the movable arms 130 open so as to release plant jams. The two pairs of belts 96 and 98 are rotatably mounted on the two pairs of rails 100 and 102, respectively. Two interior belt rails 100a and 102a are fixed to a lower beam member 112 of the fixed frame 110. In this way, each conveyor assembly 92 or 94 has one movable arm 130. The movable arms 130 may be pivotably mounted to a pair of upper transverse members 122 of the fixed frame 110.

Figure 4:
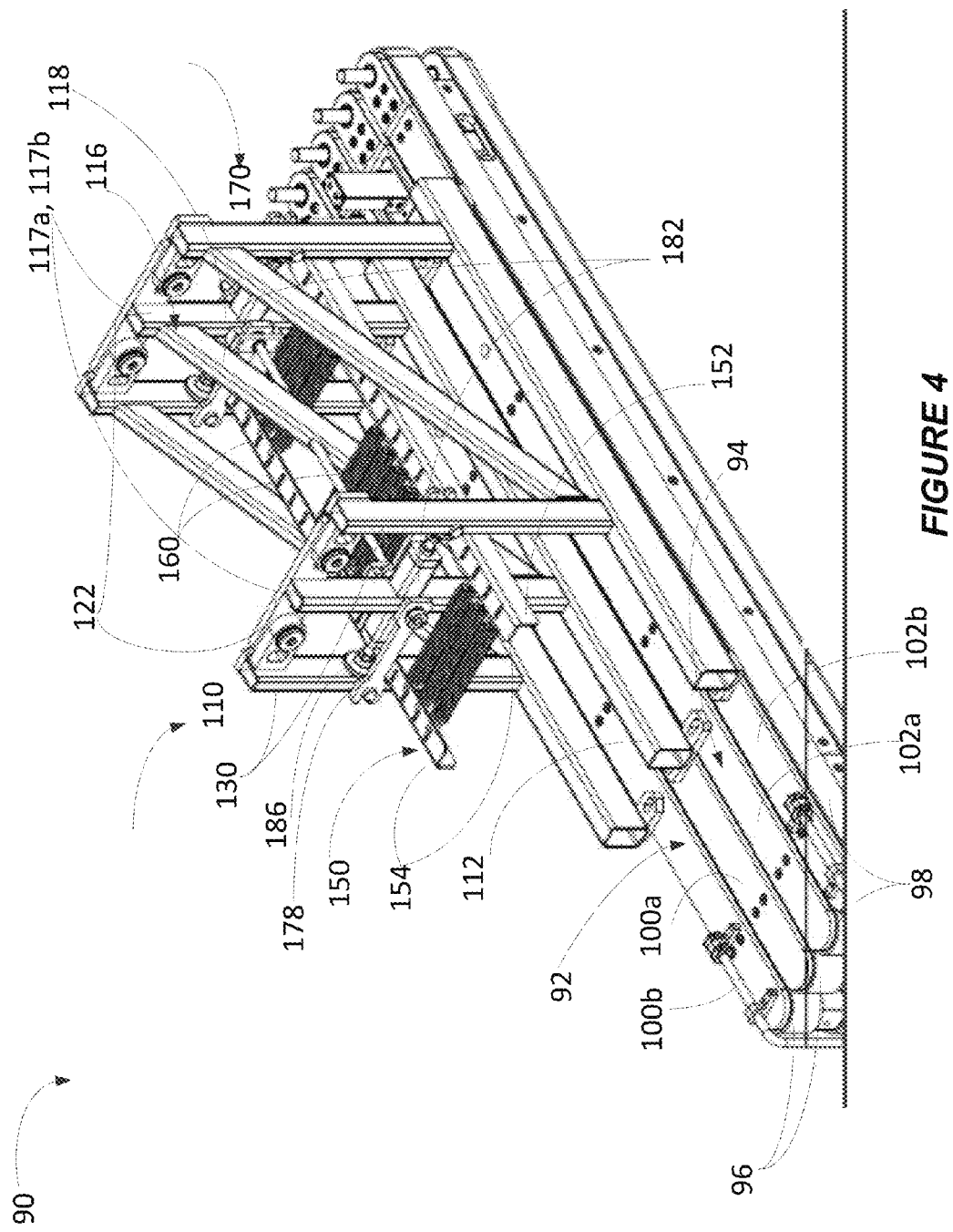
FIG. 4 is a perspective view showing another embodiment of a conveyor assembly comprising two pairs of belts.
Figure 5:
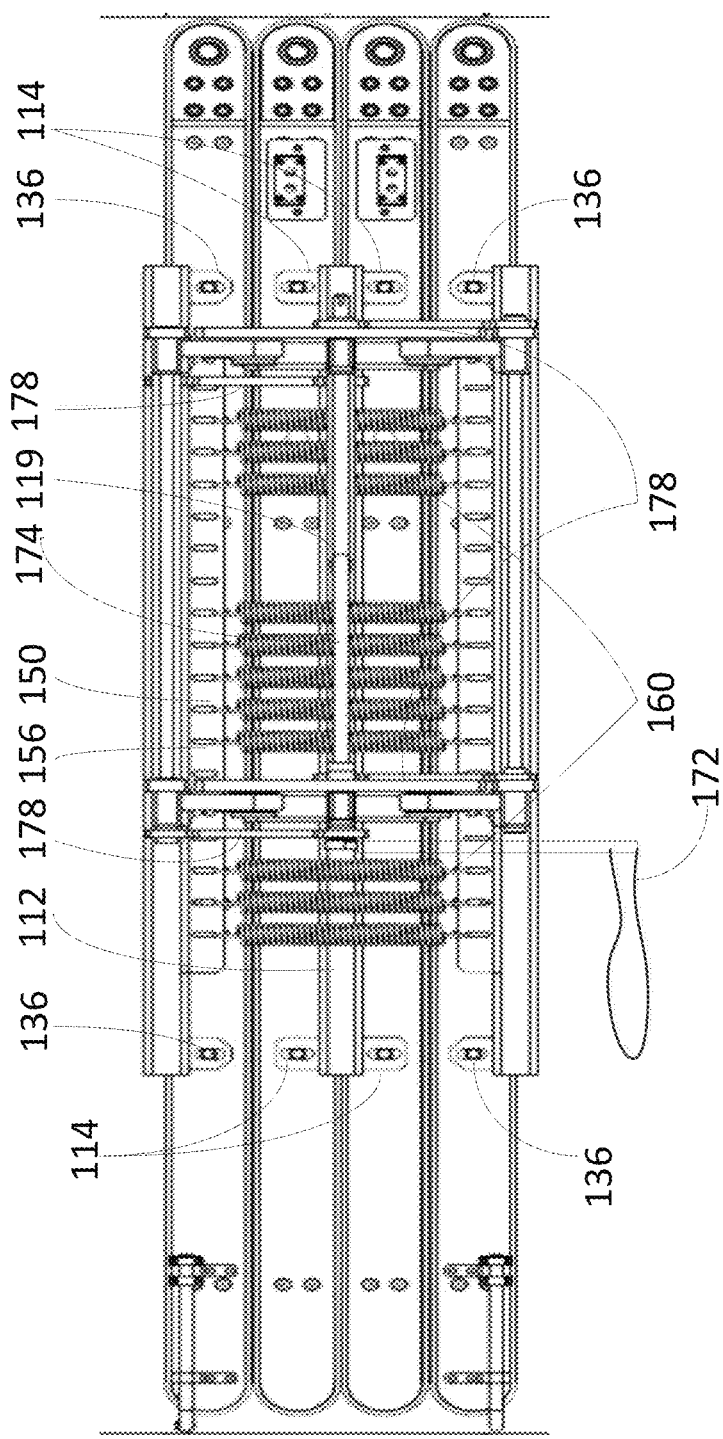
FIG. 5 is a top view of FIG. 4.

As shown in FIG. 4 and FIG. 5, the fixed frame 110 comprises the lower beam member 112, an upper structure 116, and the pair of upper transverse members 122. A pair of mounting members 114 is located at the two ends of the lower beam member 112 respectively. Each mounting member 114 contains two slots adjacent to its two ends respectively. The pair of mounting members 114 is used to fix the two interior belt rails 100a and 102a to the lower beam member 112. Optionally, the two interior belt rails 100a and 102a can be fixed to the lower beam member 112 by any other suitable means, such as by welding. The upper structure 116 comprises two vertical beams 117a and 117b, and one diagonal beam 118 which, in the example depicted in FIG. 4, are oriented in a "Z" shape. The lower ends of the two vertical beams 117a and 117b are fixed to the lower beam member 112 by any suitable means, such as welding.

The upper ends of the two vertical beams 117a and 117b are fixed to the pair of upper transverse members 122 by any suitable means, such as welding. Three aligned apertures 119 are formed in the three beams of the upper structure 116 respectively so that a shaft 174 of the expanding mechanism 170 can go through them. Two pairs of apertures are formed at the two ends of the pair of upper transverse members 122, and each pair of apertures is used to pivotally mount the corresponding movable arm 130.

Figure 6:
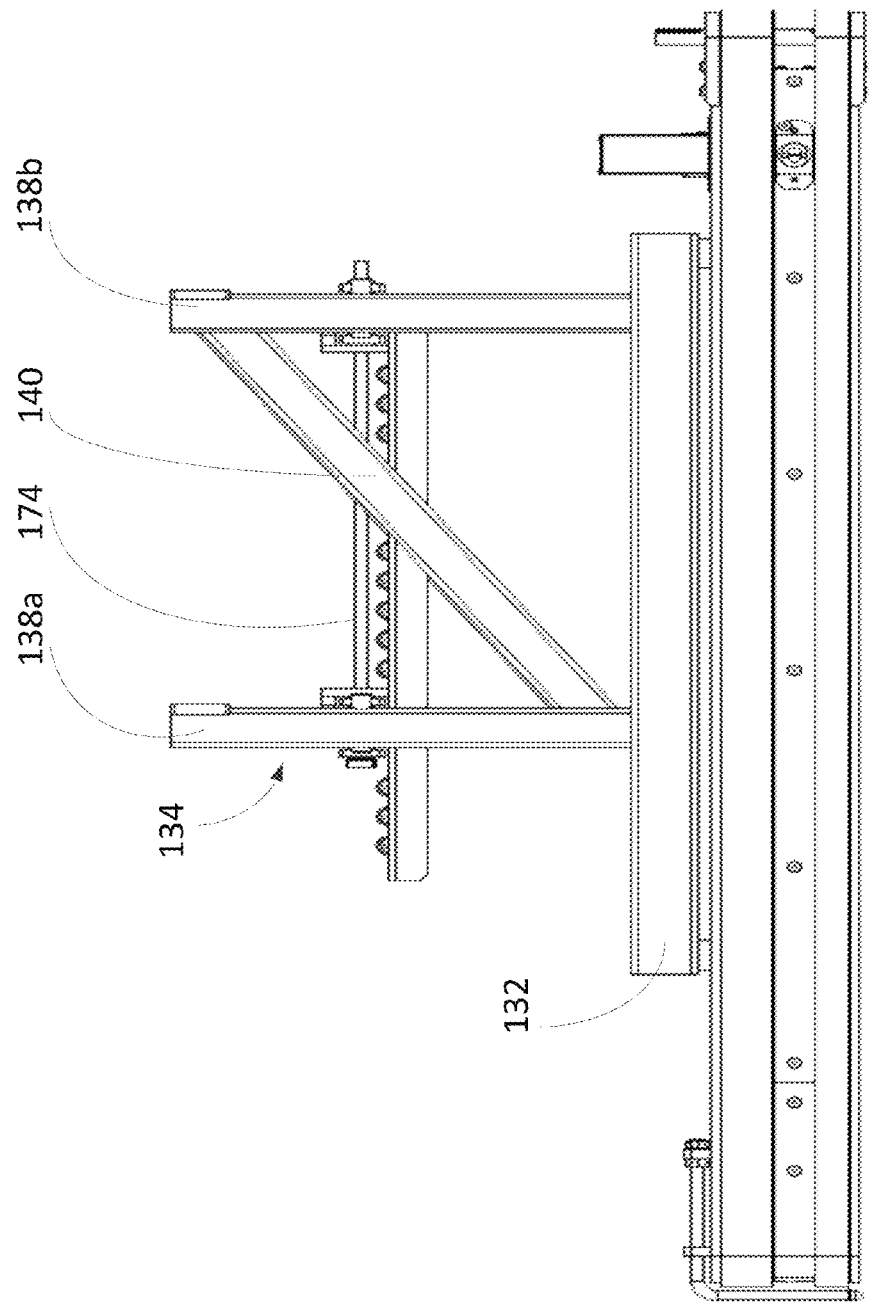
FIG. 6 is a side view of FIG. 4.

As shown in FIGS. 4-7, each movable arm 130 includes a lower beam 132 and an upper structure 134 which is perpendicularly fixed to the lower beam 132. A pair of mounting plates 136 is located at the two ends of each lower beam 132 respectively, and they are used to fix a corresponding outside belt rail 100b or 102b to the lower beam 132. Optionally, each lower beam 132 may be fixed to the corresponding outside belt rail by any other suitable means, such as by welding. The upper structure 134 comprises two vertical beams 138a and 138b, and a diagonal beam 140 which, in the example depicted in FIGS. 4 and 6, are oriented in a "Z" shape. The lower ends of the two vertical beams 138a and 138b are fixed to the lower beam member 132 by any suitable means, such as welding. A flange 142 is located at the upper end of each vertical beam 138a or 138b. Each flange 142 is drilled with an aperture which corresponds to the aperture formed at the either end of the upper transverse member 122. Each flange 142 is pivotally mounted to the corresponding end of the upper transverse member 122 by a loose bolt 144. Optionally, the movable arms 130 may be pivotally mounted to the upper transverse member 122 by any other suitable means. In virtue of this arrangement, each arm 130 is movable relative to the fixed frame 110 so as to allow the corresponding outside belt rail to move with respect to the corresponding interior belt rail.

As shown in FIGS. 4-7, each supporting member 150 comprises a vertical surface 152 and a horizontal surface 154. Each supporting member 150 can be formed integrally or by welding two pieces together. The vertical surface 152 of each supporting member 150 is fixed to the two vertical beams 138a, 138b, and the diagonal beam 140 of the corresponding movable arm 130 by any suitable means, such as welding. Several slots 156 are located in the horizontal surfaces 154 of the pair of supporting members 150. The slots 156 can be used to mount one or more bias members 160 to the supporting members 150. In the embodiment depicted in FIGS. 4-7, the one or more bias members 160 are in the form of linear springs. The supporting members 150 and the one or more bias members 160 are positioned above and away from the belt rails 100 and 102 to allow plants to pass through the conveyor assembly 90. The supporting members 150 and the one or more bias members 160 are located below and adjacent to the expanding mechanism 170.

In normal operation, the bias members 160 apply an inward force on the movable arms 130 to bias them toward the fixed frame 110 so that the outside belt rails 100b and 102b are biased toward the corresponding interior belt rails 100a and 102a while still permitting the gap between each pair of belts to vary according to varied diameters of plants. The ability of the gap between the paired belts to vary while still biasing one belt rail toward another belt rail permits the paired belts to convey plants of various sizes while mitigating plant damage caused by the grasp of the paired belts and plant jams in the paired belts. The number and locations of the one or more bias members 160 may be varied according to the particular needs. While the one or more bias members 160 are depicted in FIGS. 4-7 as linear springs, the one or more bias members 160 may be any other types of bias members capable of biasing the movable arms 130 toward the fixed frame 110, such as rubber belt.

Figure 7:
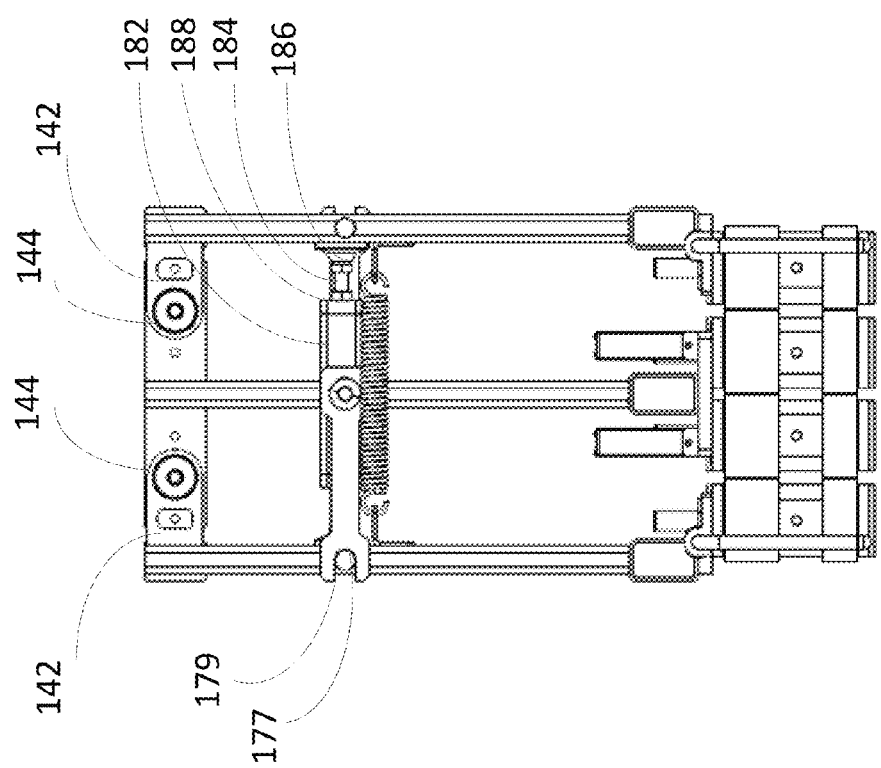
FIG. 7 is a front view of FIG. 4.
Figure 8:
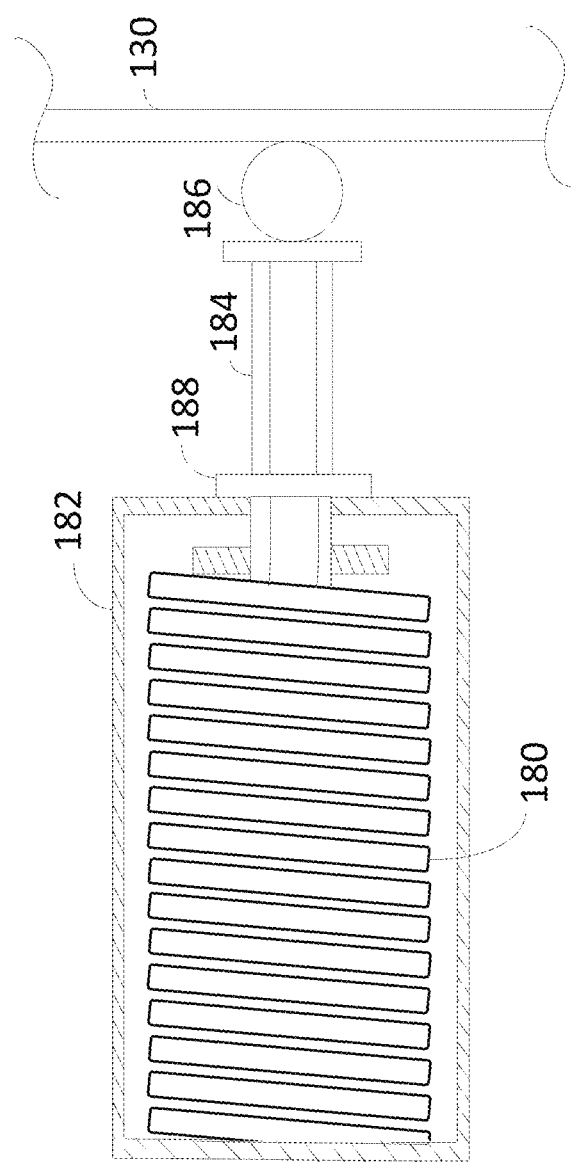
FIG. 8 is a partial cross sectional view showing encased spring of an expanding mechanism of the present application.

As shown in FIGS. 4-8, the expanding mechanism 170 is positioned above and adjacent to the supporting members 150 and the bias members 160. The expanding mechanism 170 includes a handle 172, a shaft 174, two pairs of cams 176, two pairs of rods 178, two pairs of compressible members 180, two pair of chambers 182, the two pairs of bars 184, and the two pairs of ball bearings 186. The handle 172 is connected to the shaft 174. The shaft 174 is coupled to the cams 176. As mentioned above, the shaft 174 is configured to go through the three aligned apertures 119 formed in the vertical beams 117a and 117b and the diagonal beam 118 of the fixed frame 110. The cams 176 engage with the corresponding rods 178. The rods 178 are coupled to the movable arms 130 by any suitable means. By way of example without limitation, a groove 179 can be formed at one end of each rod 178. The groove 179 may engage with a corresponding protrusion 177 which is fixed to the movable arm 130. The compressible members 180 are encased in the corresponding chambers 182 and coupled to the corresponding bars 184. While the compressible members 180 are depicted in FIG. 8 as springs, they may be any other types of compressible members capable of being released to create an outward force. The ball bearings 186 are positioned at one end of the corresponding bars 184. Also, the ball bearings 186 are attached to the corresponding movable arm 130.

A user can manipulate the expanding mechanism 170 to apply an outward force on the movable arms 130 to overcome the inward tension applied on the movable arms 130 by the bias members 160 and expand the movable arms 130 open so as to release plant jams in the paired belts 96 and 98. When the handle 172 is rotated, a first outward force is exerted on the rods 178 by the corresponding cams 176. The rods 178 apply the first outward force to the movable arms 130, whereby moving the movable arms 130 away from the fixed frame 110. Accordingly, the two outside belt rails 100b and 102b move away from the two interior belt rails 100a and 102a, thus expanding the paired belts 96 and 98 open. The compressible members 180 can facilitate to expand the paired belts 96 and 98 open. In normal operation, the compressible members 180 are compressed in the corresponding chambers 182. The movement of the movable arms 130 under the first outward force exerted by the rods 178 can release compression of the compressible members 180, thereby applying a second outward force on the bars 184. The second outward force is exerted on the movable arms 130 by the ball bearings 186, whereby facilitating to move the moveable arms 130 away from the fixed frame 110 and expand the paired belts 96 and 98 open. Expanding the paired belts 96 and 98 open by manipulating the expanding mechanism 170 permits any plant jams to be released more easily and without having to remove any of the bias members 160 which bias the outside belt rails 100b and 102b toward the interior belt rails 100a and 102a.

The arrangement of the compressible members 180 can also facilitate to bias the movable arms 130 and automatically adjust the gaps between the paired belts 96 and 98 according to varied diameters of plants. Under the combined action of the inward tension by the bias members 160 and the outward force by the compressible members 180, the movable arms 130 can be more smoothly biased to accommodate various sizes of plants. In addition, as shown in FIGS. 7-8, thread is formed on each bar 184. A nut 188 can be installed on the corresponding bar 184. The length of the bar 184 outside the chamber 182 can be adjustable by rotating the nut 188. In case that there appears a gap between the ball bearing 186 and the movable arm 130, a user can manually adjust the nut 188 in order to increase the length of the bar 184 outside the chamber 182, whereby attaching the ball bearing 186 to the movable arm 130.

FIGS. 4-8 show an illustrative example of the expanding mechanism 170. In another embodiment, there may be two handles 172 which are positioned at either end of the fixed frame 110 respectively. In this way, a user can activate the expanding mechanism 170 to expand the paired belts open at the front side or the back side of the conveyor assembly 90 by turning either handle 172. This arrangement increases the convenience of manipulating the expanding mechanism 170. In a further embodiment, the expanding mechanism 170 may be configured to expand the movable arms 130 open at one or more locations rather than two locations as shown in FIGS. 4-6 by decreasing or increasing corresponding number of the structure comprising cams, rods, compressible members encased in chambers, bars, and ball bearings. Added cams may be attached to the single shaft 174 which is connected to the handles 172. Thus, the paired belts can be expanded open at more locations by turning either handle 172 for one time. Optionally, the expanding mechanism 170 may adopt any other suitable structures which are capable of exerting an outward force on the movable arms 130 to overcome the inward tension on the movable arms 130 by the bias members 160 and expand the paired belts open so as to release plant jams.

The number of the conveyor assembly 90 included in a conveyer and spacing between adjacent conveyor assembly 90 may be varied according to particular needs of harvesting operation. By way of example without limitation, a conveyor included in a harvester may comprise three conveyor assemblies with certain spacing between adjacent conveyor assemblies. The structure of each conveyor assembly can be similar to the structure of the conveyor assembly 90 described above. Each conveyor assembly include two movable arms, one or more bias members, and an expanding mechanism. The three conveyor assemblies can share a pair of upper transverse members of the fixed frame 110. The fixed frame 110 further include two outside supporting members which are used to fix the conveyor to a main frame of the harvester. The outside supporting members can be configured into any shapes or structures which are suitable to fix the conveyor to the main frame. By way of example without limitation, the outside supporting members may be oriented in a "Z" shape. In addition to being used in a seedling harvester, a conveyor according to the present application can be used to any other circumstances in which there are needs to grasp crops, vegetables, other plants, or other things in a substantially upright orientation and to move them from a position to another position along a conveyor axis.

Operation of the aforementioned harvester including three conveyer assemblies 90 is described here. The harvester also includes a blade, a plant transport apparatus, and one or more root soil removers. When the harvester is in use, it can be towed behind a wheeled tractor or other engine driven vehicle by means of a hitch. Optionally, the harvester may be integrated with a tractor. After a body of soil containing plants is severed by a blade and lifted onto a plant transport apparatus, the body of soil containing plants is conveyed along the plant transport apparatus to a point where the stem portions of the plants are engaged by the paired belts of the plant conveyor. Once the paired belts engage the stem portions of the plants, the movable arms of the conveyor are biased by the corresponding bias members to acquire a desirable gap between each pair of belts according to the varied diameters of the plants. The ability of the gap between each pair of belts to be adjusted automatically to accommodate varied diameters of the plants can not only significantly reduce stem damage and plant jams, but also it can save the trouble of manually adjusting the gap between each pair of belts. When plant jams occasionally occur, they can be easily and conveniently released by a user manipulating the corresponding expanding mechanism. When the handle of the corresponding mechanism is turned, a first outward force by the rods is exerted on the corresponding movable arms. Meanwhile, a second outward force by compressible member is also applied the corresponding movable arms. The first and second outward forces expand the corresponding movable arms and the belt rails attached to the movable arms open. The ability of expanding each pair of belts open allows any plant jams in the paired belts to be released easily and efficiently. The harvester including the conveyor assembly 90 overcomes the aforementioned weaknesses of the harvester 20 depicted in FIGS. 1-2 and other current harvesters.

Figure 9:
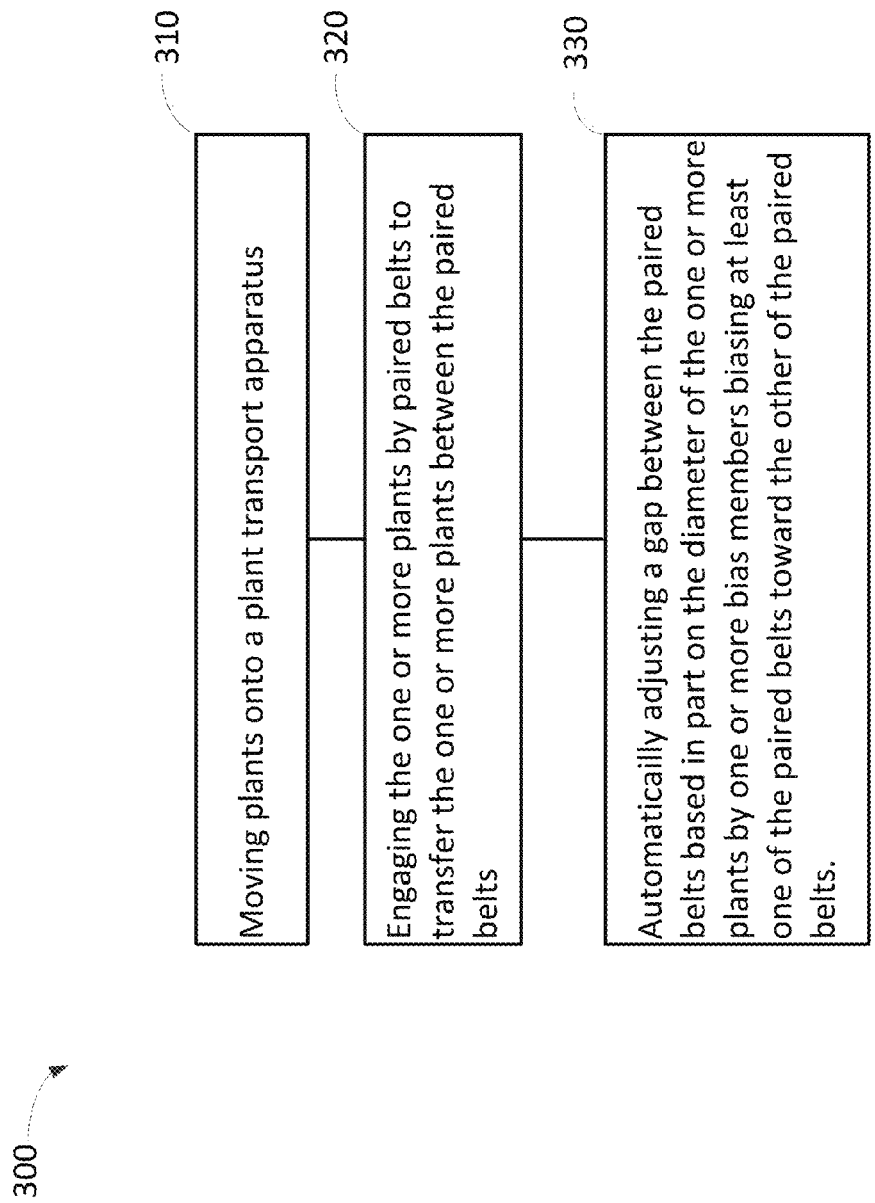
FIG. 9 is a flow diagram of a method for harvesting plants according to the present application.

FIG. 9 depicts an embodiment of a method 300 for harvesting plants by using a harvester including a conveyor of the present application. At block 310, after a blade severs a body of soil containing plants, the body of soil with the plants is lifted onto a plant transport apparatus. The use of the plant transport apparatus capable of supporting the body of soil containing plants from below can reduce damage to the plants. This is done to minimize root tip breakage and stem damage resulting from the downward pull on the plants caused by the soil weight. Also, little risk of the plants slipping from paired belts of a conveyor due to the support by the transport apparatus allows a wider gap between the paired belts of the conveyor (such as the example shown in FIG. 2); therefore, the paired belts do not have to tightly grasp the plants, whereby significantly reducing plant stem damage. At block 320, the soil and plants are engaged by the paired belts of the conveyor in order to be transferred along a conveyor axis. The plants are transferred along the plant transport apparatus to a point where the opposite sides of a plant stem are engaged by the paired belts of the conveyor. At block 330, the gap between each pair of belts is automatically adjusted to accommodate varied diameters of the plants by one or more bias members capable of biasing at least one movable arm toward the other arm of a conveyor assembly. The bias member may be a linear spring, a torsion spring, a rubber belt, or any other suitable bias members capable of biasing at least one movable arm toward the other arm of each conveyor assembly. This configuration of at least one biased movable arm of each conveyor assembly allows the gap between each pair of belts to vary in order to accommodate various sizes of plants. The ability of automatically adjusting the gap between each pair of belts according to varied diameters of plants is advantageous to mitigate plant damage and plant jams and save the trouble of manually adjusting the gap between paired belts. When desirable gaps between the paired belts are available, the plants are grasped by the paired belts in a substantially upright orientation and moved along a conveyor axis from a position before the plants exits the plant transport apparatus to another position where the plants enter a stowage bin.

The method 300 may further include the step of manipulating an expanding mechanism to release plant jams. Plant jams can occur at times, such as when plants bunch together at the entry point into the paired belts or when the harvester cuts the soil too deep and soil enters the belts. By manipulating the expanding mechanism, any plant jams can be easily released. The expanding mechanism can adopt any suitable structures which are capable of exerting an outward force on movable arms of the conveyor to overcome the inward tension by the bias members and expand the movable arms and corresponding paired belts open. By way of example without any limitation, the expanding mechanism may comprises a handle, a shaft, two pair of cams, two pairs of rods, two pairs of compressible members encased in two pair of chambers, two pairs of bars, and two pairs of ball bearings. The handle is connected to the shaft and the cams. The cams are coupled to the rods. The rods engage the corresponding movable arms. The two pairs of springs are compressed in the chambers and coupled to the bars. The ball bearings are positioned at one end of the corresponding bars, and are attached to the corresponding movable arm of the conveyor. By turning the handle, a first outward force is applied to the rods by the corresponding cams. The first outward force is exerted to the corresponding movable arms by the rods, whereby expanding the corresponding movable arms and paired belts open. Meanwhile, the compressible members can exert a second outward force on the corresponding bars and ball bearings, whereby facilitating to expand the corresponding movable arms and the belt rails attached to the movable arms paired belts open. Expanding the paired belts of the conveyor open enables any plant jams in the paired belts to be released conveniently.

The method 300 may further comprise the step of removing plant root soil by one or more root soil removers after the plants exit the plant transport apparatus and while they are propelled within the paired belts of the conveyor. Preferably, the one or more root soil removers are not driven by any mechanical means, such as a drive motor. Each root soil remover includes a plurality of flexible probes, and is capable of freely rotate in the direction of plant travel. The free rotating nature of the one or more root soil removers minimizes drag on the plants and their root tips, whereby reducing damage to plant roots.

In addition to the embodiments discussed above, the present application is likely to have various alterations, modifications, and improvements which will readily occur to those skilled in the art. For instance, the specific choice of materials with respect to the bias members and the compressible members, and the number choice of conveyor assemblies included in a conveyor, the choice of spacing between adjacent conveyor assemblies, and the specific configuration of the expanding mechanism are within the ability of those skilled in the art according to the application, based on the functional indications given above. The specification and drawings are, accordingly, to be regarded in an illustrative rather than a restrictive sense. It will, however, be evident that various modifications and changes may be made thereunto without departing from the broader spirit and scope of the invention.

What is claimed:

1. An apparatus, comprising:
    a frame;
    at least two arms, at least one of said at least two arms movably mounted to the frame;
    at least two rails, each rail coupled to an end of one of said at least two arms;
    at least two belts, each belt rotatably mounted on one of said at least two rails such that the belts are capable of engaging plants therebetween and moving the plants along a conveyor axis;
    one or more bias members configured to bias at least one of said at least two arms toward another one of said at least two arms; and an expanding mechanism configured to exert an outward force on said at least one movable arm upon engagement so that said at least one movable arm moves away from another arm, said expanding mechanism comprising:
- at least one rotatable cam;
- at least one rod being engaged by said at least one rotatable cam, said at least one rod applying a first outward force on said at least one movable arm; and
- at least one compressible member that provides a second outward force on the at least one movable arm.

2. The apparatus of claim 1 wherein said one or more bias members are coupled to said at least two arms.

3. The apparatus of claim 2 wherein two pairs of belts are grouped together by fixing two interior belt rails to a same member of the frame.

4. The apparatus of claim 3 wherein the bias members are disposed in a position to provide clearance for the plants.

5. The apparatus of claim 1 wherein each compressible member comprises a spring.

6. The apparatus of claim 1 wherein at least one of the one or more bias members comprises a spring.

7. A apparatus kit, comprising:
- a frame;
- at least two arms, at least one of said at least two arms movably mountable to the frame;
- at least two rails, each rail coupleable to an end of one of said at least two arms;
- at least two belts, each belt rotatably mountable on one of said at least two rails such that the belts are capable of engaging plants therebetween and moving the plants along a conveyor axis;
- one or more bias members capable of biasing at least one of said at least two arms toward another one of said at least two arms; and
- an expanding mechanism capable of exerting an outward force on said at least one movable arm upon engagement so that said at least one movable arm moves away from another arm, said expanding mechanism comprising:
  - at least one rotatable cam;
  - at least one rod capable of being engaged by said at least one rotatable cam, said at least one rod capable of applying a first outward force on said at least one movable arm; and
  - at least one compressible member that provides a second outward force on the at least one movable arm.

8. The kit of claim 7 wherein said one or more bias members are coupleable to said at least two arms.

9. The kit of claim 8 wherein two pairs of belts are capable of being grouped together by fixing two interior belt rails to a same member of the frame.

10. The kit of claim 9 wherein the bias members are disposed in a position to provide clearance for the plants.

11. The kit of claim 7 wherein at least one of the one or more bias members comprises a spring.

12. The kit of claim 7 wherein each compressible member comprises a spring.

* * * * *